US007849878B2

(12) United States Patent
Kohler et al.

(10) Patent No.: US 7,849,878 B2
(45) Date of Patent: Dec. 14, 2010

(54) GAS TURBINE COMPRESSOR WATER WASH CONTROL OF DRAIN WATER PURGE AND SENSING OF RINSE AND WASH COMPLETION

(75) Inventors: Rodney W. Kohler, Apollo Beach, FL (US); Thomas Wagner, Troy, NY (US)

(73) Assignee: Gas Turbine Efficiency Sweden AB (SE)

( * ) Notice: Subject to any disclaimer, the term of this patent is extended or adjusted under 35 U.S.C. 154(b) by 213 days.

(21) Appl. No.: 11/869,404

(22) Filed: Oct. 9, 2007

(65) Prior Publication Data

US 2008/0087300 A1 Apr. 17, 2008

Related U.S. Application Data

(60) Provisional application No. 60/852,041, filed on Oct. 16, 2006, provisional application No. 60/861,401, filed on Nov. 28, 2006.

(51) Int. Cl.
*F16K 11/00* (2006.01)
*F16K 21/00* (2006.01)

(52) U.S. Cl. .............................. 137/625.46; 134/56 R; 134/57 R; 134/58 R; 134/60; 134/104.2

(58) Field of Classification Search ................ 137/625, 137/625.46
See application file for complete search history.

(56) References Cited

U.S. PATENT DOCUMENTS 4,512,360 A * 4/1985 Chronister .................. 137/326
5,868,860 A 2/1999 Asplund
2001/0047834 A1* 12/2001 Menin et al. ................ 137/875
2003/0209256 A1 11/2003 Tadayon ...................... 134/10
2006/0048796 A1 3/2006 Asplund et al.
2006/0081521 A1 4/2006 Hjerpe et al.

FOREIGN PATENT DOCUMENTS

DE 2701823 8/1977
DE 94 20 362.8 3/1995
WO WO 2005/077554 A1 8/2005
WO WO 2005/120953 A1 12/2005
WO WO 2005/121509 A1 12/2005

* cited by examiner

*Primary Examiner*—Michael Kornakov
*Assistant Examiner*—Natasha Campbell
(74) *Attorney, Agent, or Firm*—DLA Piper LLP (US)

(57) ABSTRACT

A purge drain valve including a spool spliced in a fluid line includes a control valve and an actuator coupled to the control valve for regulating fluid flow. During a washing operation, fluid flows between a supply end and a delivery end of the spool, and during a purging operation, the control valve diverts fluid entering the supply end from the delivery end towards a drain leg. A washing system includes a fluid supply coupled to an input of a wash delivery system and a delivery line coupled to an output of the wash delivery system. The purge drain may be spliced into the delivery line to permit fluid to reach a wash apparatus during a washing operation and to prevent fluid from reaching the wash apparatus during a purging operation. A rinse cycle sensor apparatus may be employed to indicate to an operator if a washing operation is complete based upon a conductivity of fluid exiting from a device being washed.

17 Claims, 5 Drawing Sheets

PURGE DRAIN VALVE
100

PURGE DRAIN VALVE
100

3-WAY PURGE DRAIN VALVE 100'

GAS TURBINE COMPRESSOR WATER WASH CONTROL OF DRAIN WATER PURGE AND SENSING OF RINSE AND WASH COMPLETION

TECHNICAL FIELD

The present invention relates to on-line and off-line wash processes of a gas turbine compressor. More specifically, an apparatus prevents water from reaching compressor blades during a wash manifold purge operation following the on-line wash process, and a second apparatus indicates a rinse completion during an off-line wash process.

BACKGROUND

An on-line wash process for a gas turbine compressor is performed to clean the compressor of contaminates that may become attached to compressor blades during operation and that may drastically reduce efficiency of the compressor. After the on-line wash process of the gas turbine compressor, a purge may be performed on nozzle supply lines that may be utilized to supply wash to the compressor. The purge may reduce or eliminate de-mineralized or de-ionized water that may be collected in the nozzle supply lines during the on-line wash process. During the purge, low pressure water may exit the nozzles of the cleaning apparatus and flow into the compressor, impinging compressor blades. As the stream of water continues to impact the rotating compressor blades over a multitude of washes, it may form a stress riser from erosion on the surface of the blade. This erosion of the blade may typically lead to increased maintenance costs and/or a potentially catastrophic failure in the compressor. Thus, an apparatus is needed to prevent low pressure water from reaching the nozzles.

An off-line wash process for a gas turbine compressor is performed to more effectively clean the compressor of the attached contaminates. During the off-line wash process, detergent is added to water for removal of the contaminates that water alone cannot achieve. Additionally, an extensive amount of de-mineralized or de-ionized water is used to ensure the effectiveness of the wash and the optimization of performance recovery. De-mineralized and de-ionized water is expensive to process and often in limited supply at many sites. Operators are consequently forced to compromise between using more water than necessary to thoroughly complete a rinse or using too little water and leaving behind detergent residue, which may absorb into the blades and reduce performance of the compressor. In both cases, expense and waste is incurred. Thus, an apparatus is needed to analyze a termination time for the off-line wash process, indicating that the detergent has been fully rinsed from the compressor and that the rinsing of the off-line wash process is complete.

SUMMARY

A washing and rinsing system for use in an on-line wash process of a gas turbine compressor operates to eliminate a stream of low pressure water into the compressor. A wash delivery system delivers fluid through a delivery line to a wash apparatus during the on-line wash process. When a purge operation is being performed to eliminate de-mineralized and/or de-ionized water collected in the delivery lines of the system, a purge drain valve is actuated. The drain valve may be mounted at a junction of the delivery line and the wash apparatus. The drain valve includes an actuator for simultaneous draining of the collected water from the delivery line and the wash apparatus.

A second apparatus is used during an off-line wash process to sense completion of a rinse cycle of a gas turbine compressor. The apparatus may be placed in the discharge drain line of the gas turbine compressor. A sensor takes readings of a wash rinse being discharged, and the readings are provided to a computing system by a transmitter attached to the sensor. Preset conditions specify conditions when the rinse cycle may be terminated and may indicate an amount of detergent and/or contaminates in the wash rinse.

DETAILED DESCRIPTION

The present disclosure relates to a system, method, and apparatus for sensing completion of a fluid washing and/or rinsing operation and for controlling fluid flow during a fluid purging operation. To that end, the present disclosure describes a novel "feedback loop" for use in a washing and/or rinsing system. This feedback loop is configured to indicate when washing and/or rinsing operations of such a system have been completed. With such an indication, an operator of the washing/rinsing system is able minimize the amounts of fluids used during such operations, resulting in cost savings and in reduced wash/rinse times. In another aspect, the present disclosure describes a novel purge drain valve for controlling the flow of fluids during a purging operation. As further discussed below, the feedback loop and purge drain valve combine to provide a novel system for controlling and optimizing the flow of fluids during both a washing/rinsing operation and during a fluid purging operation.

Figure 1A:
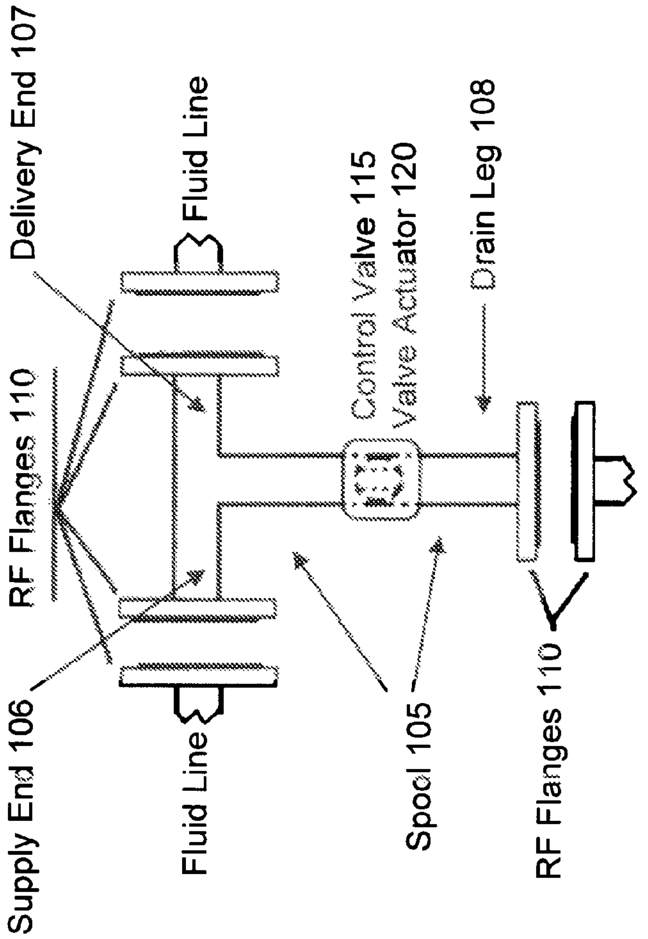
FIG. 1*a* is a diagram illustrating details of an exemplary purge drain apparatus.

Referring now to FIG. 1*a*, an exemplary purge drain valve 100 in accordance with the present disclosure is illustrated. This purge drain valve 100 comprises a spool 105 having a supply end 106, a delivery end 107, and a drain leg 108. Coupled to the supply and delivery ends 106 and 107 are flanges 110 for use in splicing the purge drain valve 100 into a fluid line, thereby defining a supply side and a delivery side of the fluid line (not shown), respectively. Although raised face (RF) flanges are shown in this illustration, it should be understood that any adequate flange known in the art may be utilized in accordance with the present disclosure.

Figure 1B:
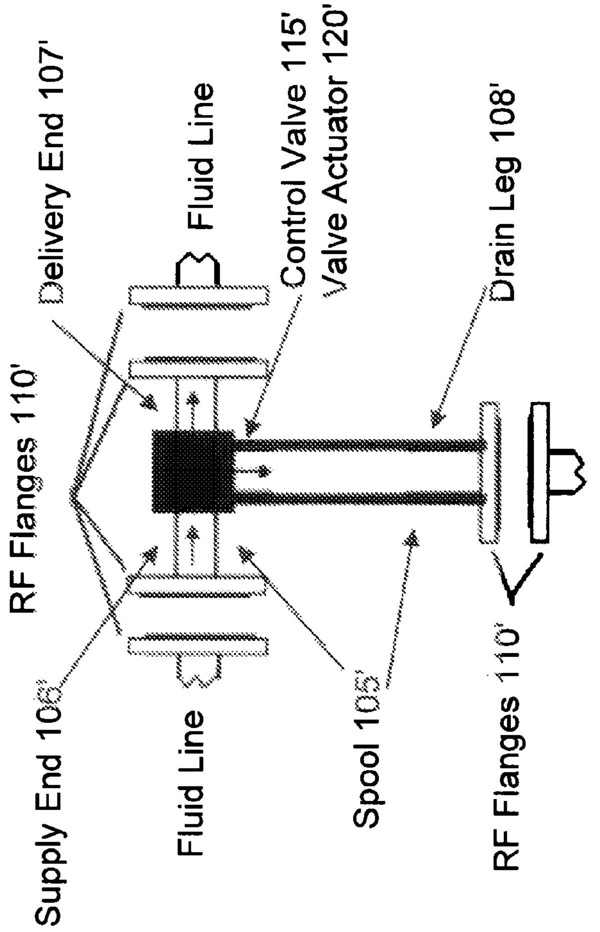
FIG. 1*b* is a diagram illustrating details of another exemplary purge drain apparatus.

Also included as part of the exemplary purge drain valve 100 is a control valve 115 for regulating and directing fluid flow as desired. Any suitable control valve 115 known in the art may be utilized, although a full port ball-type valve is preferred as it may be effective in reducing any pressure drops experienced within the control valve 115 itself during operation. Since the exemplary purge drain valve 100 is a two-way device, the control valve 115 is shown coupled to the drain leg 108 of the purge drain valve 100. Alternatively, if the purge drain valve 100 were configured as a three-way valve 100', as illustrated in FIG. 1*b*, the control valve 115' could be disposed within the spool 105' between the supply and delivery ends 106' and 107' for regulating/diverting the flow of fluid.

Coupled to the control valve 115 of the purge drain valve 100 is a valve actuator 120 for opening and closing the control valve 115 as desired. The valve actuator 120 may be operated by any means known in the art such as, for example, electrically, pneumatically, or manually operated.

The end of the drain leg 108 may configured for coupling to a drain fluid capturing system for capturing any fluid diverted due to actuation of the control valve 115.

In operation, the exemplary purge drain valves 100 illustrated in FIG. 1*a* may be utilized in a washing and rinsing system, which system is used for cleaning large industrial equipment, such as large gas turbine compressors, for example. In such a system, the purge drain valve 100 may be spliced into a system fluid line that delivers fluid from a fluid source to a fluid delivery mechanism. During the system's washing/rinsing operation, the control valve 115 is completely opened so as to allow fluid to freely flow from the fluid source to the fluid delivery system. Once the washing/rinsing operation is complete, however, fluid may remain in the fluid line, thereby requiring a purging operation to rid the fluid line of any such fluid.

Simply purging the fluid line by forcing air through it, however, may actually cause damage to the equipment being washed. To illustrate, if the washing/rinsing system described above were used to wash and rinse a gas turbine compressor, de-mineralized or de-ionized water would remain in the system's fluid lines once the washing/rinsing operations were completed. If pressurized air were used to purge the fluid line, the contents of the fluid line would simply be forced to impinge onto the turbine compressor's blades, which could result in blade erosion. The novel purge drain valve 100 of the present disclosure avoids such a problem by safely preventing purged fluid from reaching any equipment being washed by the washing/rinsing system.

Once the system's washing/rinsing operations are completed, and prior to initiating the system's purging mechanism, the valve actuator 120 actuates the control valve 115, thereby shutting off or diverting the path of the fluid to the compressor. Once the control valve 115 is actuated, air may be safely injected into the fluid line. The air forces any remaining fluid in the line to flow through the spool 105 and out of the drain leg 108, thereby preventing the purged fluid from reaching the compressor.

Figure 2:
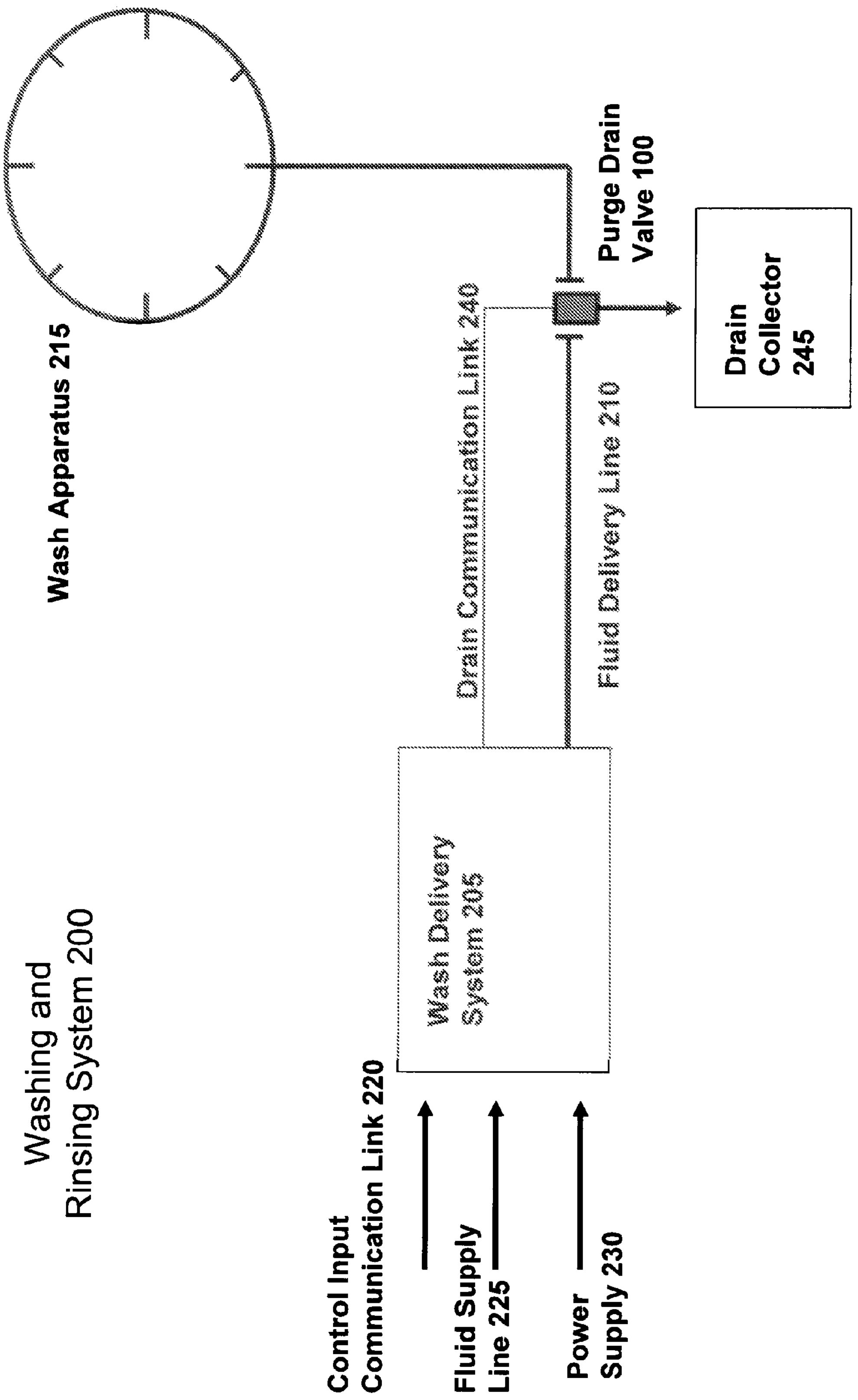
FIG. 2 is a block diagram of an exemplary washing and rinsing system.

Referring now to FIG. 2, an exemplary washing and rinsing system 200 (hereinafter, the "wash system 200") is shown comprising the exemplary purge drain valve 100 described above. As indicated above, the wash system 200 may be utilized for cleaning large, industrial equipment including, without limit, gas turbine compressors.

Included in the exemplary wash system 200 is a wash delivery system 205 for delivering fluids such as water, wash solvents, purge air, and/or other substances from a fluid supply line 225 to a fluid delivery line 210. The wash delivery system 205 may include one or more containers for storing fluids for use in washing/rinsing operations. Depending on the particular application, the wash delivery system 205 may be configured to condition or process any fluids being stored therein in anticipation of a washing/rinsing operation.

A control input communication link 220 is coupled to the wash delivery system 205 for delivering control communications signals to the wash delivery system 205 related to the delivery of fluids. These control signals may be generated from a remote controller (not shown), such as, for example, an operator, a computing device, and/or a plant controller.

Also coupled to an input of the wash delivery system 205 is a fluid supply line 225 for delivering washing/rinsing fluid from a fluid supply source (not shown) to the wash delivery system 205. The fluid supply line includes a supply valve (not shown) for regulating the flow of fluid into the wash delivery system 205.

Powering the wash delivery system 205 is a power supply 230.

Coupled to an output of the wash delivery system 205 is a fluid delivery line 210 for delivering fluids from the wash delivery system 205 to a wash apparatus 215. The wash apparatus 215 may be any suitable apparatus known in the art for use in washing large, industrial equipment such as a water wash manifold, a nozzle assembly, a supply pump, reservoir tanks, and/or a combination thereof.

Spliced into the fluid delivery line 210, between the wash delivery system 205 and the wash apparatus 215, is a novel purge drain valve 100. The purge drain valve 100, as described above, is used to regulate the flow of fluids through the fluid delivery line 210 during washing and rinsing operations and during purging operations. The purge drain valve 100 comprises a control valve 115 which is actuated via a valve actuator 120. Depending on whether the purge drain valve 100 is a two-way or three way valve, the control valve may be coupled to a drain leg portion of the purge drain valve 100 or the control valve 115 may be within the spool portion of the purge drain valve 100.

A drain communication link 240 is coupled between the wash delivery system 205 and the purge drain valve 100 for transmitting control signals to control the actuation of the purge drain valve 100. These control signals are automatically generated via the wash delivery system 205 once a purging operation is initiated. Alternatively, the control signals may be generated external to the system 200 and transmitted from the control input communication link 220, through the wash delivery system 205, and through the drain communication link 240 to the drain valve 100.

Optionally, a drain collector 245 may be positioned beneath the purge drain valve 100 and/or coupled to the drain leg of the purge drain valve 100 for transfer to a controlled drain or for collecting purged fluids exiting the system 200.

In operation, the control input communication link 220 transmits control signals to the wash delivery system 205 to initiate a washing and/or rinsing process. These control signals may be generated from a remote controller (not shown), such as, for example, an operator, a computing device, and/or a plant controller. In response to the control signals, the wash delivery system 205 opens the supply valve (not shown) coupled to the fluid supply line 225, thereby enabling washing/rinsing fluid to enter the wash delivery system 205. The wash delivery system 205 then dispenses the fluid through the fluid delivery line 210 accordingly. Optionally, before dispensing of the fluid, the wash delivery system 205 may condition or otherwise process the fluid according to the particular application.

Since the system 200 is in a "washing" or "rinsing" mode, control signals transmitted via the drain communication link 240 instruct the purge drain valve 100 to remain open, thereby allowing the fluid to freely flow between the wash delivery system 205 and the wash apparatus 215. The control signals for regulating the purge drain valve 100 may originate from the wash delivery system 205 as provided from a remote controller.

Once the washing and/or rinsing operation is completed, the control input communication link 220 transmits a control signal to the wash delivery system 205 to cease dispensing wash fluid to the wash apparatus 215. The control signal may originate automatically or from a remote controller. In response, the water wash delivery system 205 closes the supply valve coupled to the fluid supply line 225, thereby preventing any further fluid from entering the wash delivery system 205. The drain communication link 240 then transmits control signals to the purge drain valve 100 for initiating a purge operation. In response, the purge drain valve's actuator 120 actuates the control valve 115 to divert the flow of fluids away from the wash apparatus 215 and down through the drain valve's drain leg 108. Alternatively, the purge drain valve 100 may be actuated pneumatically or manually, depending on the particular implementation. Once the purge drain valve 100 is actuated, the wash delivery system 205 purges the delivery line 210 of any remaining fluids by delivering pressurized air through the fluid delivery line 210.

Any fluids that remain in the fluid delivery line 210 between the wash delivery system 205 and the purge drain valve 100 will be forced through the drain valve 100 and out through the valve's drain leg 108 to a drain collector 245. Fluids remaining in the wash apparatus 215 and in the fluid delivery line 210 between the purge drain valve 100 and the wash apparatus 215 are initially driven through a nozzle tip, for approximately 15 to 20 seconds, for example, but will rapidly allow air passage to the nozzle and will be allowed to drain, free following the stop command for the purge air flow. At the purge drain valve 100, the fluids draining from the wash apparatus are diverted to and collected by the drain collector 245.

In an exemplary implementation wherein the system 200 of FIG. 2 is utilized to wash a gas turbine compressor, the wash apparatus 215 may be inserted within an inlet of the compressor to allow fluids to reach and clean the inlet. Once the washing procedure is complete, the purge drain valve 100 may be actuated and a purging operation may be initiated. As the purge drain valve 100 during the purging operation prevents fluids from entering the inlet of the compressor, turbine blade erosion and other blade damage may be significantly reduced.

Figure 3:
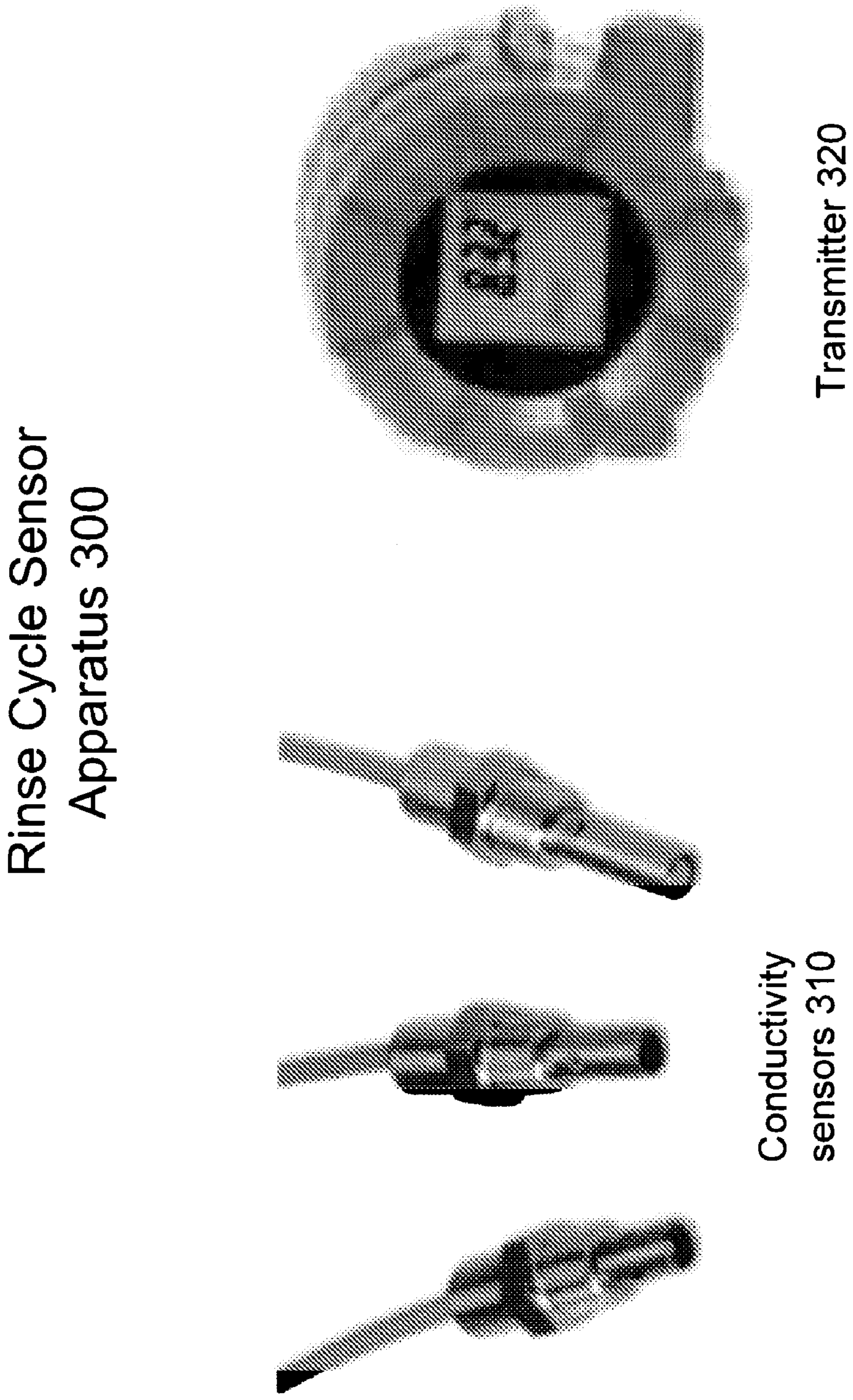
FIG. 3 is an exemplary illustration of a rinse cycle sensor apparatus.

With reference to FIG. 3, components 310, 320 of an exemplary rinse cycle sensor apparatus 300 is illustrated. The exemplary rinse cycle apparatus 300 may be utilized during a washing and/or rinsing operations as a "feedback loop" for indicating to an operator when the washing and/or rinsing operations have been completed. With such an indication, an operator of the washing/rinsing system is able to minimize the amounts of fluids used during such operations, resulting in cost savings and in reduced wash/rinse times In an exemplary embodiment, the components 310, 320 of the sensor apparatus 300 may be implemented in the exemplary system 200 of FIG. 2, although the cycle sensor apparatus 300 is not limited to such systems. Indeed, as further explained below with reference to FIG. 4, the sensor apparatus 300 may be utilized during an off-line wash/rinse operation.

The exemplary rinse cycle sensor apparatus 300 comprises a conductivity sensor 310 and a transmitter 320. The conductivity sensor 310, which may be pre-calibrated, is used to measure the conductivity of fluid as the fluids exit, for example, a turbine compressor being washed. High levels of contaminants in the fluid decrease the fluid's conductivity. Similarly, low levels of contaminants provide for higher fluid conductivity levels.

Coupled to the conductivity sensor 310 is the transmitter 320. The transmitter 320 receives conductivity measurements from the conductivity sensor 310 and transmits them to a computer system (not shown) for processing.

In operation, the conductivity sensor 310 and the transmitter 320 may be strategically disposed within a wash system so as to interact with used wash fluid as the fluid exits the machinery being washed. In an exemplary embodiment, the sensor 310 and transmitter may be mounted within a discharge drain line of the gas turbine compressor. In such an implementation, the conductivity sensor 310 and the transmitter 320 may be mounted via a screw insertion, a retractable insertion with a ball valve, a flow-through design, or by other appropriate means.

During a washing operation, used wash fluid containing detergents, contaminants, fouling, etc. exits the turbine compressor through the drain line and encounters the conductivity sensor 310. The sensor 310 measures the electric conductivity of the used fluid and provides its measurements to the transmitter 320. The transmitter 320, which may be in communication with a computing system, provides the sensor's 310 measurements to the computing system. The computing system in turn compares the measurements to either pre-loaded conductivity data or to pre-set conditions to determine the status of the washing/rinsing operation. The closer the conductivity measurements are to the pre-loaded data or pre-set conditions, the closer the washing/rinsing operation will be to being completed. Exemplary pre-set conditions may include comparing measured conductivity levels to values indicative of fluid contaminant levels, detergent levels, etc.

Once the measured conductivity levels are within an acceptable range, an operator may terminate the operation, thereby saving time, fluid, and money. Optionally, the computing system may be configured to store previously "accepted" measurements for use during future washing/rinsing operations.

Figure 4:
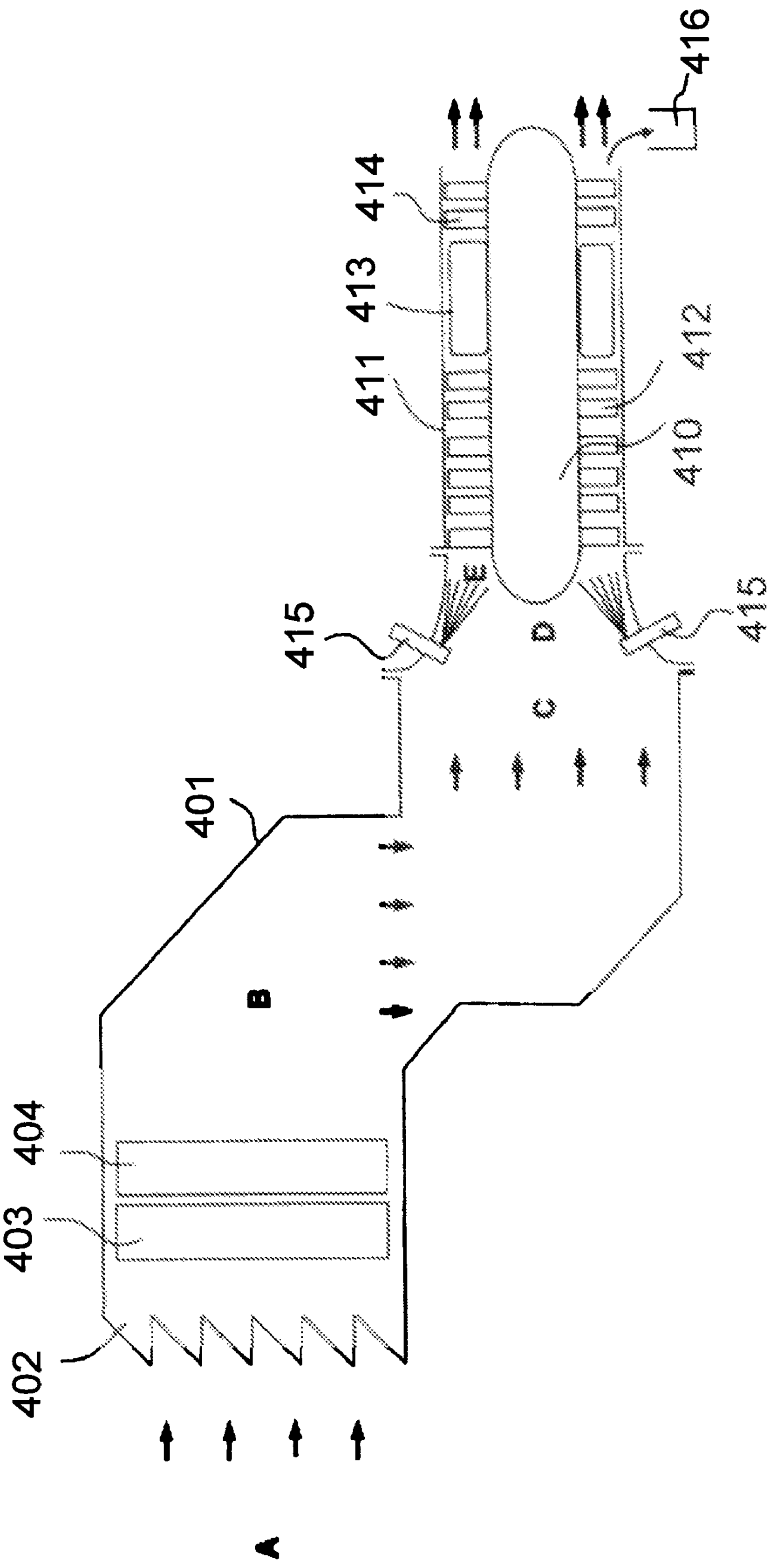
FIG. 4 is a cross-sectional view of an exemplary gas turbine inlet.

FIG. 4 illustrates a cross-sectional view of a typical gas turbine inlet 400 with rotor shaft 410, combustion zone 413, turbine blades 414, water wash nozzles 415, compressor 411, 412, and compressor discharge drain 416. The basic gas turbine operation draws ambient air from region A through an inlet filter system 402, 403, and 404. The overall inlet is a continuous air tight structure 401. Filtered air moves through the inlet regions B, C, D and is compressed by the increased velocity and flow caused by the draw from the compressor 411, 412. The air then enters the compressor 411, 412 and is further compressed. At the end of the compressor 411, 412 is a compressor discharge casing region and drain 416, which may be equipped with the rinse cycle sensor apparatus 300 described with reference to FIG. 3. Measurements taken from this apparatus 300 during the wash process are transmitted to a computer system (not shown) to determine the extent of contaminants being removed from the compressor 411, 412. Once the conductivity measurements reach predetermined levels, the system operator (not shown) can be assured that the final wash rinse is free of solids, indicating removal of detergent and contaminates from the compressor 411, 412. This information may be utilized by the operator to terminate the wash/rinse operation. In addition, the data collected during such a wash/rinse operation may be logged and stored to allow correlation with other tracked wash parameters.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This disclosure is intended to cover any adaptations or variations of the embodiments discussed herein.

What is claimed is:

1. A purge drain valve for regulating fluid flow, comprising:

a spool comprising a fluid supply end, a fluid delivery end, and a fluid drain leg;

a flange coupled to each of the fluid supply and fluid delivery ends for splicing the drain valve into a fluid line;

a control valve disposed in the drain leg; and an actuator coupled to the control valve for actuating the control valve, wherein during a washing operation, the control valve is operable to permit fluid to flow freely between the fluid supply end and the fluid delivery end; and wherein during a purging operation, the control valve enables fluid in the fluid supply end and fluid in the fluid delivery end to be simultaneously diverted to flow through the fluid drain leg.

2. The purge drain valve of claim 1, wherein the flange is a raised face (RF) flange.

3. The purge drain valve of claim 1, wherein the control valve is a full port ball-type valve.

4. The purge drain valve of claim 1, wherein the control valve is a two-way valve.

5. The purge drain valve of claim 1, wherein the control valve is a three-way valve disposed within the spool between the fluid supply end and the fluid delivery end.

6. The purge drain valve of claim 1, wherein the actuator is manually, electrically, or pneumatically actuated.

7. A washing system comprising:

a wash delivery system;

a fluid supply coupled to an input of the wash delivery system;

a fluid delivery line coupled at one end to an output of the wash delivery system;

a wash apparatus coupled at an opposite end of the fluid delivery line for receiving wash fluid via the fluid delivery line and injecting the wash fluid into an object desired to be washed; and a purge drain valve spliced into the fluid delivery line between the wash delivery system and the wash apparatus, wherein the purge drain valve comprises a spool having a fluid supply end, a fluid delivery end, and a fluid drain end; a flange coupled to each of the fluid supply end and fluid delivery end for splicing the drain valve into the fluid delivery line; a control valve disposed in the drain end; an actuator coupled to the control valve for actuating the control valve;

wherein, during a washing operation, the purge drain valve is operable to permit wash fluid to flow free between the wash delivery system and the wash apparatus; and wherein during a purging operation, the drain valve is operable to prevent wash fluid from entering the wash apparatus and is enabled to simultaneously divert wash fluid from the wash delivery system and the wash apparatus to the drain end.

8. The washing system of claim 7, further comprising a control input coupled to an input of the wash delivery system for transmitting input control signals to the wash delivery system.

9. The washing system of claim 8, further comprising a control output coupled between an output of the wash delivery system and an input of the purge drain valve for transmitting output control signals to the drain valve, the output control signals operable to actuate the purge drain valve.

10. The washing system of claim 9, wherein the wash delivery system generates the output control signals operable to actuate the purge drain valve.

11. The washing system of claim 7, further comprising a power supply coupled to an input of the wash delivery system to provide power to the wash delivery system.

12. The washing system of claim 7, wherein the wash delivery system includes one or more containers for storing fluids for use in the washing operation.

13. The washing system of claim 12, wherein the wash delivery system processes the fluids being stored therein for the washing operation.

14. The washing system of claim 7, further comprising a drain collector to collect purged fluids diverted to the drain end.

15. The washing system of claim 7, further comprising a supply valve coupled to the fluid supply, wherein the supply valve is operably opened and closed by the wash delivery system.

16. The washing system of claim 7, wherein during the purging operation, pressurized air flows between the wash delivery system to the purge drain valve.

17. The washing system of claim 7, wherein the wash apparatus comprises a water wash manifold and/or a nozzle assembly.

* * * * *